Feb. 18, 1936.         B. F. FITCH         2,030,862
MEANS FOR POSITIONING FREIGHT ON VEHICLES
Filed Jan. 23, 1932          5 Sheets-Sheet 1

Feb. 18, 1936.  B. F. FITCH  2,030,862
MEANS FOR POSITIONING FREIGHT ON VEHICLES
Filed Jan. 28, 1932   5 Sheets-Sheet 2
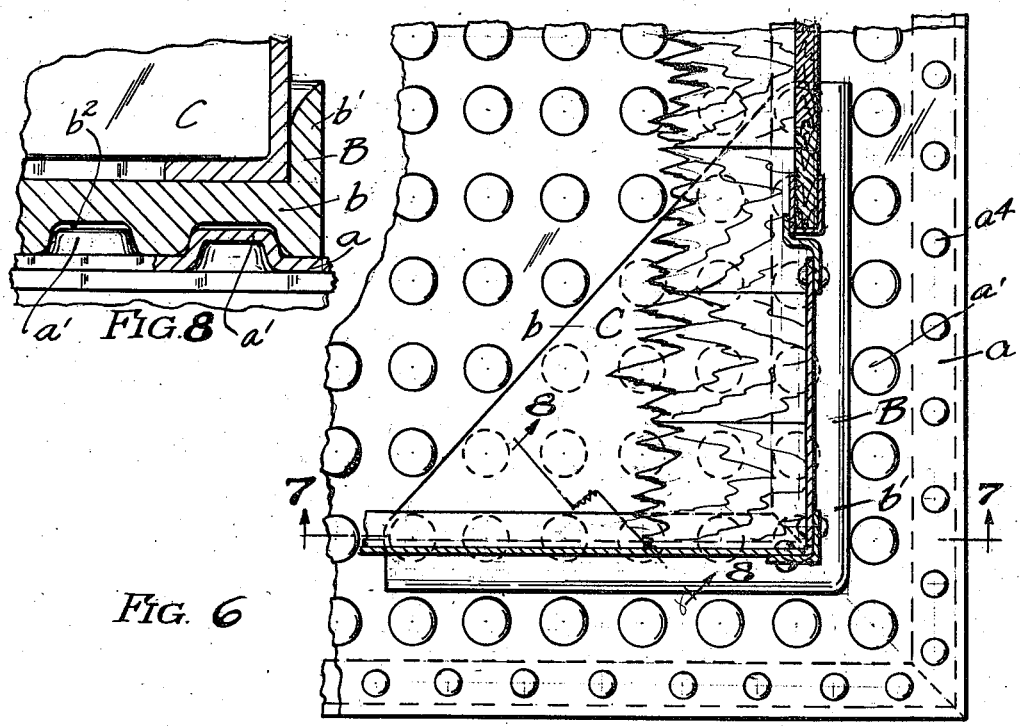
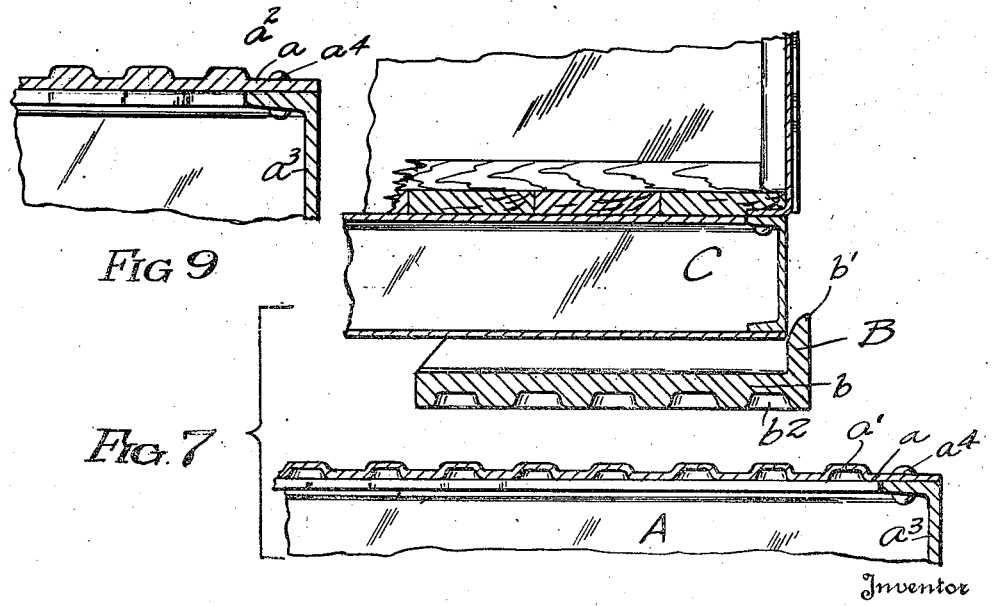
Inventor
Benjamin F. Fitch
By Bates Goldrick Stearns
Attorneys Feb. 18, 1936.   B. F. FITCH   2,030,862
MEANS FOR POSITIONING FREIGHT ON VEHICLES
Filed Jan. 28, 1932   5 Sheets-Sheet 3

Inventor:
Benjamin F. Fitch.
By Baker, Golrick & Tear,
Attorneys

Feb. 18, 1936. B. F. FITCH 2,030,862
MEANS FOR POSITIONING FREIGHT ON VEHICLES
Filed Jan. 28, 1932 5 Sheets-Sheet 4

Inventor
Benjamin F. Fitch,
By Bakes, Yolrick & Tear,
Attorneys

Patented Feb. 18, 1936

2,030,862

UNITED STATES PATENT OFFICE 2,030,862

MEANS FOR POSITIONING FREIGHT ON VEHICLES

Benjamin F. Fitch, Greenwich, Conn., assignor to Motor Terminals Company, New York, N. Y., a corporation of Delaware Application January 28, 1932, Serial No. 589,393

18 Claims. (Cl. 105—366)

This invention relates to means adapted to be held in various locations on the floor of a vehicle to position freight so that it will not be shifted in transit. To accomplish this, I provide a specially formed floor surface on the vehicle, which may cover all or a portion of the floor, and a corner bracket or positioner having its under surface formed in a somewhat complementary manner so that it may be placed wherever desired on the floor, and will become locked thereto against shifting as soon as a freight container is deposited on the bracket.

The container may be of itself a demountable automobile body adapted to be deposited on a flat car or other vehicle; or it may comprise a simple box to be placed in a box car. The invention comprises the vehicle having the floor surface so equipped, and also the positioning bracket adapted to coact with the floor surface and with the container.

If desired, the container may have a door lock controlled by the variably positioned bracket; and this is also a feature of my invention.

For some installations it may be desirable to dispense with the bracket independent of the container, and form the bottom of the container with an under surface corresponding to the under surface of the bracket so that such container may be placed in various locations on the floor and become locked thereto against shifting. This is likewise included within my invention.

My invention is hereinafter more fully explained in connection with preferred embodiments illustrated in the drawings, and the essential and novel features are summarized in the claims.

In the drawings:

Fig. 6 is a horizontal section through a corner portion of a body held by my invention on a vehicle floor, the position of the section being illustrated, as for instance, by the line 6—6 on Fig. 2.

Fig. 7 is a vertical section through car floor, the corner bracket, and the container, the three parts being separated vertically for clearness in illustration.

Fig. 8 is a cross section through the same parts when in engagement, the section being selected through some such region as indicated by the line 8—8 on Fig. 6.

Fig. 9 is the vertical section through a portion of a vehicle floor of a somewhat modified form.

Figure 1:
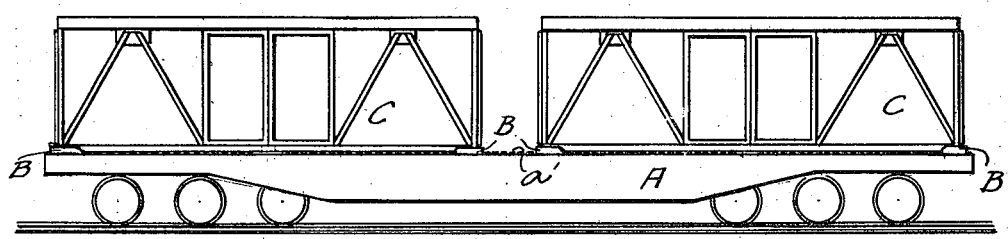
Fig. 1 is a side elevation of a flat car on which are mounted two large size demountable automobile bodies positioned by my invention.
Figure 2:
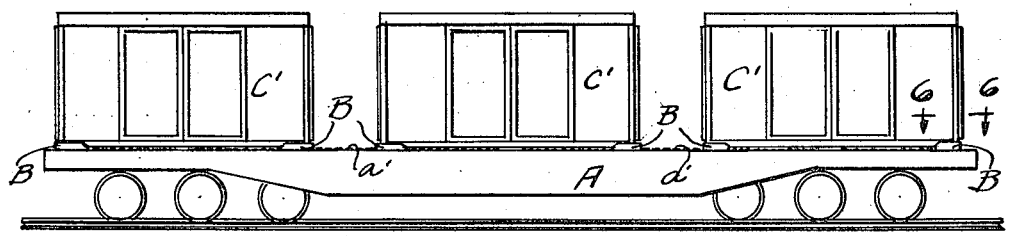
Fig. 2 is a side elevation of a similar car carrying three shorter bodies positioned on the same floor surface.
Figure 3:
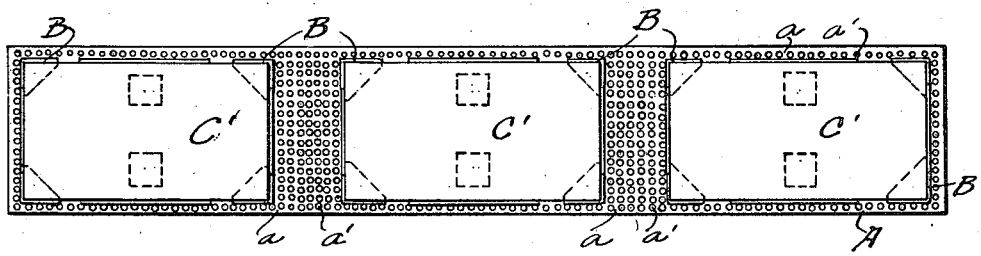
Fig. 3 is a plan of the installation of Fig. 2.
Figure 4:
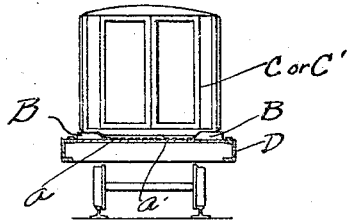
Fig. 4 is an end view of a truck with a demountable body positioned thereon by this invention.

In Figs. 1, 2 and 3, I have indicated a railway flat car A having its floor formed of sheet metal $a$, with regularly spaced upwardly formed projections $a^1$, adapted to coact selectively with the positioning brackets as hereinafter explained. The surface may be metal sheets laid on, and secured to, a wooden floor of a car, or may of themselves constitute the floor of the car. As illustrated especially in Figs. 7 and 8, the floor sheet $a$ constitutes the flooring of the car, and the projections $a^1$ of this sheet are made by upwardly pressed portions. In Fig. 9, similar projections, indicated at $a^2$, are thickened portions of a rolled sheet. In each case, these sheets are suitably secured, as by rivets, to floor beams. I have indicated such floor beams at $a^3$, and the rivets at $a^4$.

In Figs. 1, 2, 3 and 6, the projections are round, and they are arranged in straight rows in two directions. That is to say, they are equally spaced within the row, and the rows are spaced from each other corresponding to the spacing of the projections; and thus the projections may align, whether transversely, longitudinally, or diagonally at 45°. This is a simple and convenient arrangement, though not imperative. In other views, I have shown various other arrangements of the projections; but this showing is intended merely as an illustration of different forms and not as an enumeration, since many different arrangements might be made, as the important point is that the projections be arranged in repeating patterns, each pattern adapted to cooperate with the positioning bracket.

The movable positioning device of my invention has a bottom surface formed to coact with the vehicle floor and a suitable upper surface to coact with the container or box to be located. The most usual form of this corner bracket, designated B in various figures, comprises a bottom $b$ and two upstanding walls $b^1$ at right angles to each other, the upper portions of these walls tapering outwardly on their inner sides, as shown, for instance, in Fig. 8. The under surface of the bottom portion of this bracket is provided with recesses $b^2$ adapted to coact with the projections $a^1$ or $a^2$.

The recesses $b^2$ may be rounded or square depressions corresponding to the floor projections, in which case they may be aligned in rows, or the rows may constitute grooves as hereinafter explained. In any case, there is formed, in the under surface of the bracket base, the reverse of the pattern on the car floor, or such equivalent thereof as will effectively coact with the floor pattern.

Accordingly, this corner bracket may be given various positions on the floor, being shifted in or out or lengthwise of the vehicle as may be necessary to cause four corner brackets to confine a rectangular space corresponding to the exterior of the base of the container. When the brackets are located and the container placed upon them, the weight of the container holds the brackets against riding over the floor projections, and the interlocking floor projections and bracket recesses prevent the bracket shifting on the floor. Accordingly, the container is locked in position as soon as deposited.

Figure 5:
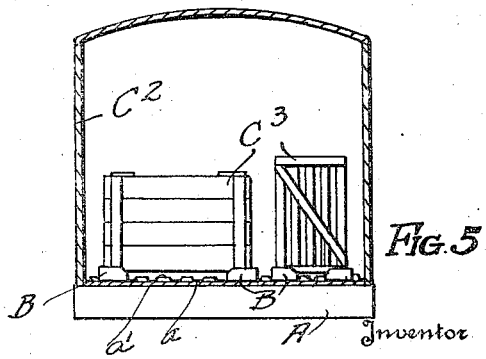
Fig. 5 is a cross section of a box car body or demountable truck body having the floor and corner brackets of my invention, and suitable for positioning various boxes within such body.

The described arrangement of floor and corner brackets allows freight containing packages of all sorts of sizes and shapes to be effectively locked in position. The projections on the floor are of low enough height so as not to interfere with ordinary hand-trucking over the floor. Accordingly, when any box or other package is to be positioned on the floor, one or more of the brackets are put in place to confine one or more corners of the package; then, after the package is located on such bracket or brackets, the other brackets are put in place while the package is still slightly raised from the floor; and then the complete deposit of the package is effected, and the hand truck being removed. In this manner, various boxes or other containers may be fixed in desired position at any location on the car floor, as illustrated in Fig. 5, where $C^2$ indicates a box car or truck body and $C^3$ packages therein.

When demountable automobile bodies are to be deposited, the dimensions of which are known, the four corner brackets are first put in place; then the body is lowered by a suitable hoist mechanism (not shown) into the grasp of these four brackets; and when once deposited, the weight of the body holds the brackets in place and the brackets prevent the body from shifting. This is the installation illustrated in Figs. 1 to 4, inclusive.

In the flat car of Figs. 1, 2 or 3, the extreme brackets occupy substantially the same position whether two automobile bodies or three are mounted on the car; but the brackets for the inner ends vary decidedly; that is to say, for two containers there are four inner brackets adjacent the center of the car, as shown in Fig. 1, whereas for three containers there are eight inner brackets,—four for the intermediate container and two for the inner ends of each of the extreme containers, and all of these intermediate brackets take a different position from the intermediate brackets of Fig. 1. My provision of a floor having repeating patterns with which the same bracket may engage at various locations, provides admirably for locking these different sized containers.

A car floor made with my surface of projections of low height is intrinsically valuable in addition to its feature of locking the positioning bracket, because these upstanding projections provide spaces between them, allowing ventilation and the passage of water, and thus maintain the bottom of the package dry. This is of considerable importance when the under surface of the package is of wood. Furthermore, when the floor sheet is made of steel, and the projections are formed by pressing or stamping, as shown in Fig. 7, they serve to reenforce and stiffen the sheet floor, increasing the rigidity thereof without material increase of weight.

Figure 10:
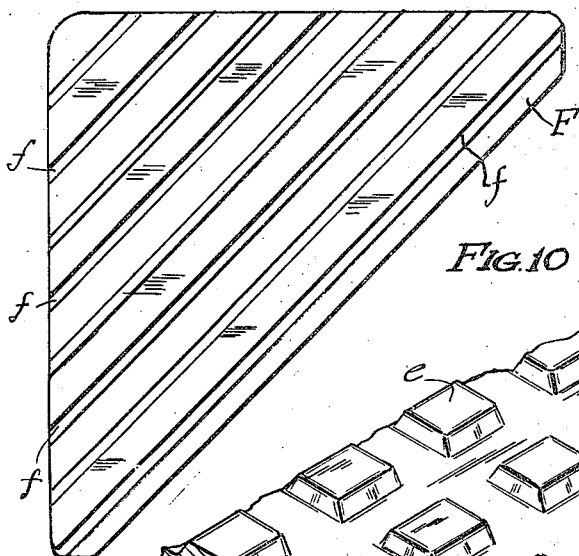
Fig. 10 is a bottom plan of modified form of corner bracket.
Figure 11:
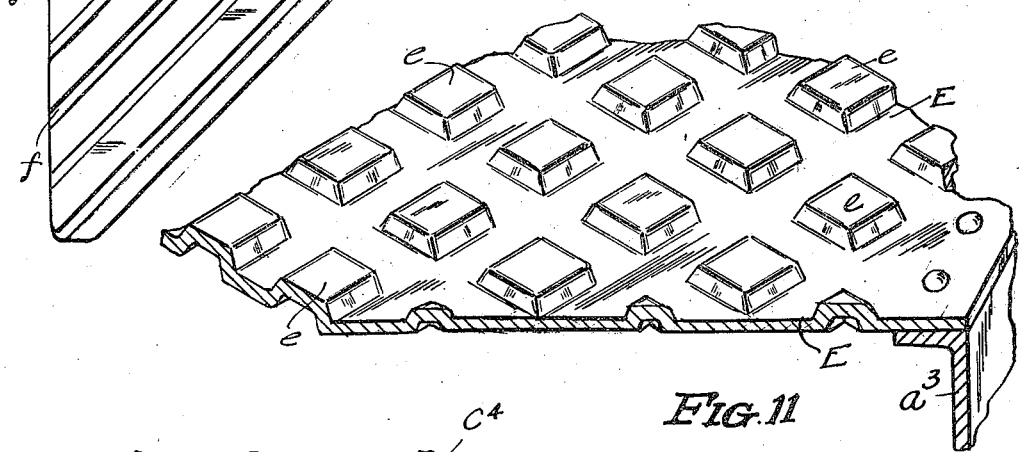
Fig. 11 is a perspective of a modified form of vehicle floor with which the bracket of Fig. 10 may coact.

In place of employing the rounded projections $a^1$ of Fig. 6, I may conveniently make these projections square, or more accurately truncated pyramids, as indicated at $e$ on the floor sheet E of Fig. 11; and I may arrange the corner brackets with their bottoms of the form shown at F in Fig. 10 with grooves $f$ in their bases adapted to receive a row of projections $e$.

The corner bracket of Fig. 10, having the grooved base, may slide diagonally of the vehicle floor along a row of projections when no container is present on the bracket; but this does not allow the bracket to shift in use, because the bracket will be so placed on the row of projections that it could not shift outwardly, laterally or longitudinally, without shifting inwardly longitudinally or laterally, and the container itself prevents any inward shifting.

Figure 12:
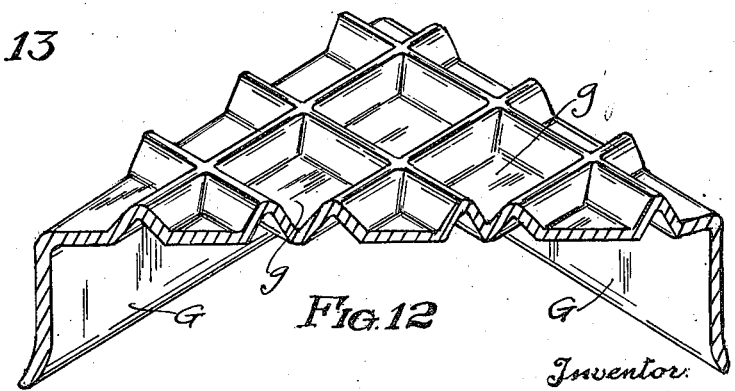
Fig. 12 is a perspective looking at the bottom of a corner bracket of still different form adapted to coact with the floor of Fig. 11.

The bracket may be formed to cooperate with the floor of Fig. 11 without possibility of shifting in any direction, if it is constructed with individual square or pyramidal pockets in its base, as indicated at $g$ in Fig. 12, for the bracket G. Irrespective of how this bracket is placed on the floor of Fig. 11, it cannot shift in any direction.

Figure 13:
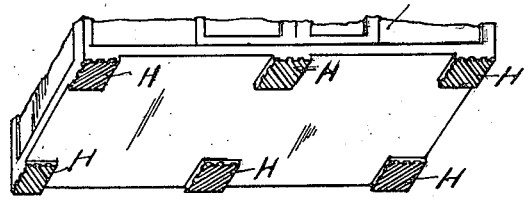
Fig. 13 is a perspective of the bottom of a container formed with ribs on its under surface to coact directly with the floor of Figs. 6 or 11.

In the construction of Fig. 13, the base of the container $C^4$ is shown as provided with diagonal ribs H, those on opposite sides lying 90° to each other. When such a container is placed on the floor of Fig. 11, there can be no shifting in any direction, though the diagonal ribs lie in the troughs between adjacent rows of projections $e$.

Figure 14:
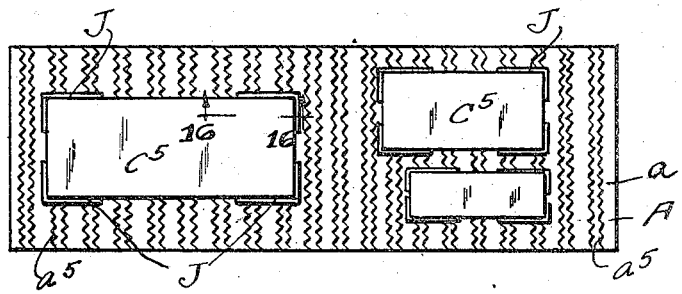
Fig. 14 is a diagrammatic plan showing a modified form of car floor, with boxes of various sizes thereon.
Figures 15, 16:
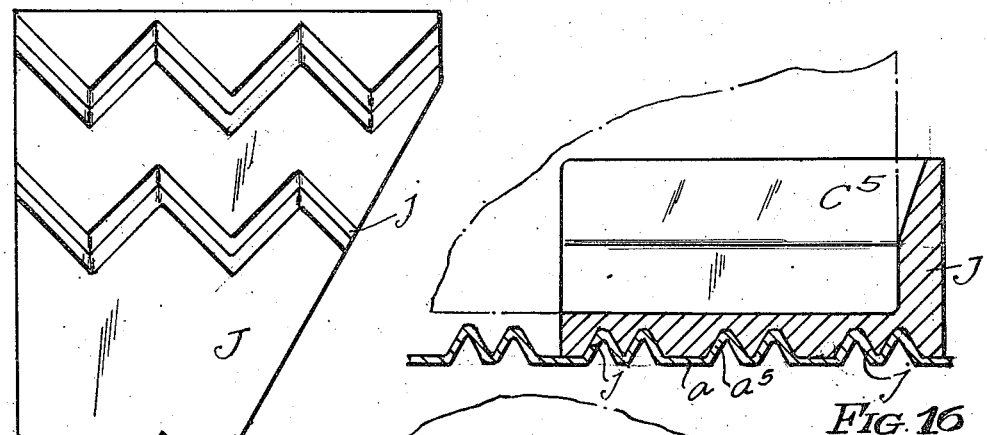
Fig. 15 is a bottom plan of a corner bracket adapted for use with the floor of Fig. 14.
Fig. 16 is a vertical section through the floor and bracket of Figs. 14 and 15.

In Figs. 14, 15 and 16, I have shown a modified form of car floor and corner bracket wherein the projections on the floor consist of transversely extending zig-zag or sinuous ribs $a^5$ and the base of the corner bracket J is formed with sinuous or zig-zag grooves $j$. In such construction, when the bracket is placed on the rib and held down by the container on the bracket, there can be no shifting in any direction. The sinuous ribs may be readily formed in the floor plate by rolling or pressing, and have the further advantage of stiffening the plate, and allowing spaces for ventilation and drainage with ordinary loading.

In this particular form, if the grooves in the corner bracket correspond only to the ribs on the floor, the use of right- and left-hand brackets is required; but this may be avoided by making two sets of grooves at right angles to each other in the base of the bracket, one set or the other being idle according to the position of the bracket.

Figure 17:
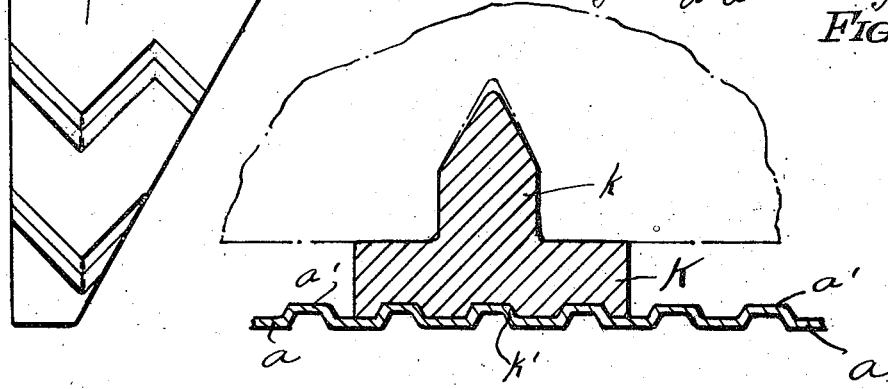
Fig. 17 is a vertical section of a modified form of bracket adapted to coact with a recess in the base of the container.
Figure 18:
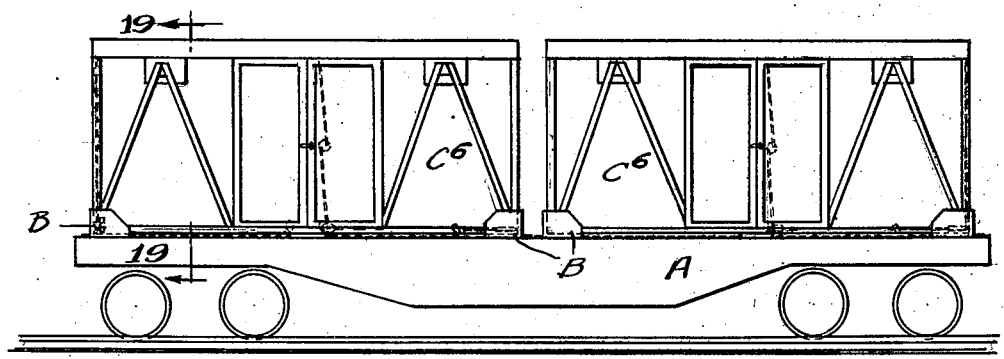
Fig. 18 is a side elevation of a car carrying two demountable bodies and so arranged that the corner brackets may act to lock the body doors.

In Fig. 17, I have shown a bracket K having a projection $k$ starting as a cylinder and terminating as a cone and adapted to cooperate with correspondingly shaped recesses formed in the bottom of the container. This construction is designed particularly for containers having the bottom recesses as shown, for instance, in my prior Patent No. 1,814,304. However, in place of the round projection, a square projection surmounted by a pyramid might be employed and coact simply with the end and side beams of the base of a container. In any case, the bottom of the bracket is formed with suitable recesses $k^1$ corresponding to the pattern formed by the car projections.

Figure 19:
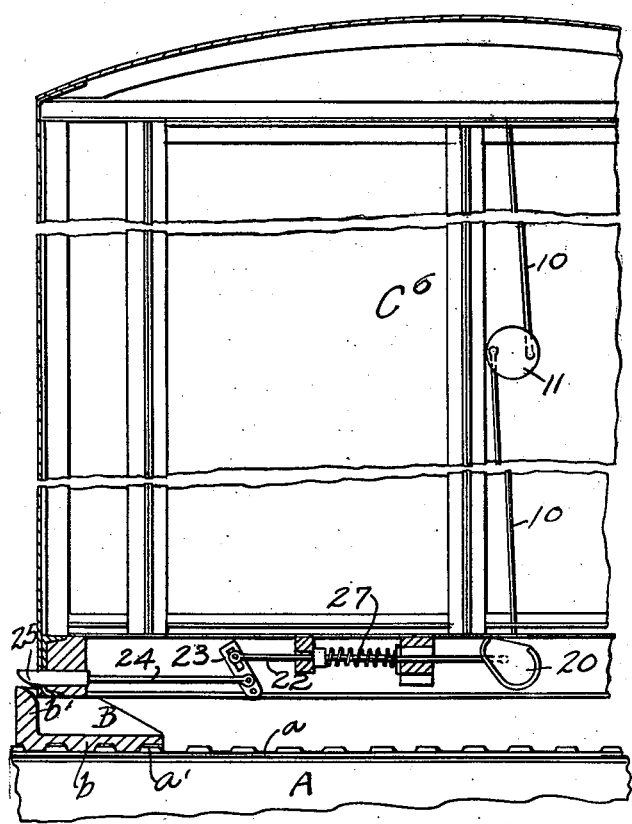
Fig. 19 is a sectional elevation of the container, car floor, and corner bracket of Fig. 18, showing the position just as the container is being deposited in place.

Figs. 18 to 21, inclusive, illustrate my corner bracket B coacting with door-locking mechanism on a container $C^5$. The mechanism on the container may be made in accordance with my Patent No. 1,685,356. Briefly, as shown, it comprises a pair of locking bolts 10 connected to a rotary plate 11 adapted to be operated by an external handle 12. These bolts extend behind ledges 14 and 15 on the container when the bolts are extended, and thus latch the door, though the bolts may be drawn inwardly as shown in Fig. 19 to lie within the range of the door and are then idle.

Figure 21:
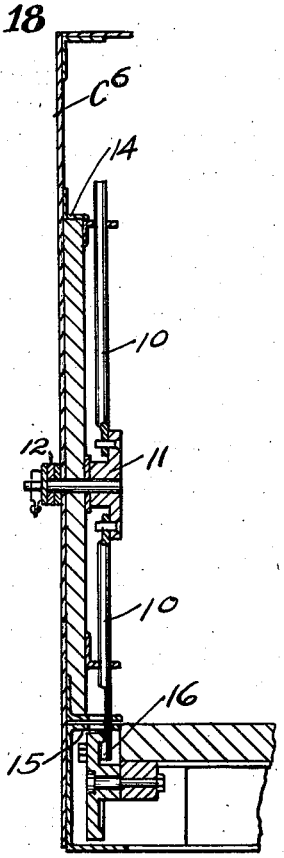
Fig. 21 is a vertical section through the container equipped with this door-locking mechanism.
Figure 20:
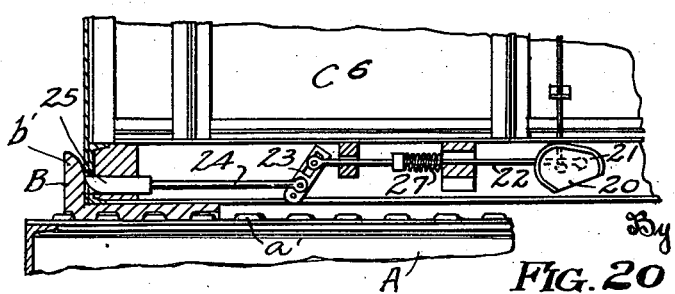
Fig. 20 is a somewhat similar section showing the position of the parts when the container is fully deposited and the door thereby locked.

When the bolts are in locked position, as shown in Figs. 20 and 21, the lower bolt has a ledge 16 in position to be engaged by a rib 21 on a rocking member 20. This rocking member is shown as connected by a rod 22, lever 23 and rod 24, to a sliding bevel-nosed latch 25 adapted to project from the edge of the container floor, as shown in Fig. 19, and engage the wall of the corner bracket B as the container is being deposited. When so deposited, this bracket wall shoves the latch 25 inwardly; thereby pushing on the rods 24 and 22 to lock the member 20 to cause the flange 21 thereof to override the latch 16, thereby locking the door bolts in their extended position so long as the container is in place.

As soon as the container is raised free from the corner bracket, a spring 27, acting on the rod 22, swings the rocking plate 20 to idle position as shown in Fig. 19, thus releasing the door lock.

The construction just described enables containers to be positioned in various locations on vehicles and become automatically locked as soon as deposited. The corner brackets B may have any desired location on the floor $a$ shown in Fig. 19, and are effective not only to locate the deposited container, but to operate the door lock.

It will be seen that by my system of vehicle floor and movable corner brackets, I have provided a very adaptable system of handling freight. Containers or packages of various sizes may be used and may be positioned wherever desired on the floor; and when once positioned can not shift in transit irrespective of the jerks or other irregularities in the operation of the vehicle. As explained, the brackets may, if desired, coact with door-locking mechanism to cause the automatic locking of the doors when the containers are properly deposited; and with these advantages goes the additional factor that I have improved the car floor itself, making it stronger and stiffer and self-draining.

I claim:

1. The combination of a vehicle, a container, and a set of removable brackets, the brackets and vehicle being formed with interlocking projections and recesses whereby the bracket may be held in various positions, the bracket having a surface on which the container may stand and having means preventing the shifting of the container with reference to the bracket.

2. The combination with a vehicle floor equipped with engageable shoulders arranged in repeated patterns and a removable positioning device having the reverse equivalent of said pattern on its under face, said positioning device being adapted to engage a container and be held in place by the weight thereof.

3. The combination of a vehicle having a floor with projections on its surface, a set of positioning brackets having recesses in their bases adapted to coact with the floor projections in various positions and arranged to confine a container resting on the brackets.

4. The combination of a vehicle having a floor with projections on its surface, a set of corner brackets having surfaces to support a container and having recesses in their bases adapted to coact with various groups of said projections on the floor, said brackets having upstanding walls to coact with the boundary of the container resting on the brackets.

5. The combination with a vehicle floor, of a corner bracket adapted to occupy various positions thereon, said bracket having two upstanding walls at substantially right angles to each other and having a base, the upper surface of which is adapted to be engaged by the bottom of a container and the lower surface of which is adapted to coact with the floor, one of said coacting members having projections and the other coacting member having recesses to receive the projections.

6. The combination with a vehicle floor having upstanding projections arranged in repeating patterns, of a corner bracket adapted to occupy various positions and having in its underface a reverse equivalent of said pattern, said bracket having an upper face adapted to support a container and having two upstanding walls at substantially right angles to each other adapted to engage a side and end of such container.

7. The combination of a car, a demountable truck body, positioning devices formed on their under sides to engage the car floor in various positions and formed on their upper sides to coact with the base of the demountable body whereby the weight of the body will hold the positioning device on the floor, and suitable interlocking projections between the positioning device and floor to prevent the shiftable device from shifting.

8. The combination of a vehicle, and a set of removable brackets, the brackets and vehicle being formed with interlocking projections and recesses whereby the brackets may be held in various positions and the brackets having surfaces on which a container may stand and having means preventing the shifting of the container with reference to the brackets, said brackets and vehicle having interlocking means comprising projections on the vehicle and grooves in the underside of the brackets.

9. A vehicle having floor surface carrying sinuous or zig-zag projections adapted to coact with complementary recesses in the under side of positioning members.

10. A corner bracket having upstanding walls at right angles to each other, and a base having grooves in its under face which may coact with complementary upward projections on a support.

11. A vehicle having a floor with upwardly extending projections arranged to aline in rows in two diagonal directions at right angles to each other and separated by draining spaces, and a container having in its bottom at the corners diagonally arranged grooves to receive said projections, the grooves at one side of the container being at right angles to those at the other sides.

12. The combination of a support, a container adapted to be deposited thereon and having a door locking mechanism, and positioning brackets adapted to coact with both the support and the container and be held on the support by the weight of the container and hold the container from shifting by reason of the coaction between the bracket and the support, said door-locking mechanism being arranged to coact with one of the brackets.

13. The combination of a vehicle, a portable corner bracket adapted to occupy various positions on the vehicle, interlocking recesses and projections on the corner bracket and vehicle floor to prevent shifting of the corner bracket in any of several locations, a container adapted to be deposited on the corner bracket, a door lock on the container having a normally projecting latch adapted to engage the corner bracket and be moved thereby to locking position when the container is deposited.

14. The combination of a vehicle having upstanding projections on the floor thereof arranged in rows, each of several projections, a portable positioning device having recesses in its base adapted to coact with various groups of projections, and a container having a door lock with a projecting latch adapted to engage said positioning device and be moved thereby to locking position when the container is deposited.

15. The combination of a car having a floor with parallel rows each of individually spaced projections, the spacing of the projections being the same as the spacing of the rows, and a container having its base provided with recesses adapted to coact with said projections in various positions of the container.

16. A vehicle adapted to carry freight and having a sheet metal floor with spaced rows of upwardly pressed spaced projections, whereby said projections aline in rows in two directions at right angles to each other and are separated by flat draining spaces, the spacing of the projections in the rows being the same as the spacing of the rows, whereby freight positioning brackets having bottom recesses may be interlocked in various positions and directions with the floor.

17. A freight-carrying vehicle having a floor surface carrying parallel spaced rows each of individually spaced projections, the spacing of the projections being equal to the spacing of the rows and the dimensions of the individual projections being the same in the direction of the rows as in the direction at right angles thereto, whereby freight positioning brackets having bottom recesses may be interlocked in various positions and directions with the floor.

18. A freight car floor having on its upper surface spaced parallel rows each of spaced round projections of the same size, the spacing of the projections in the rows being the same as the spacing of the rows, whereby freight positioning brackets having bottom recesses may be interlocked in various positions and directions with the floor.

BENJAMIN F. FITCH.